(No Model.)
H. P. TENANT.
GRAIN DRILL.
No. 291,809. Patented Jan. 8, 1884.
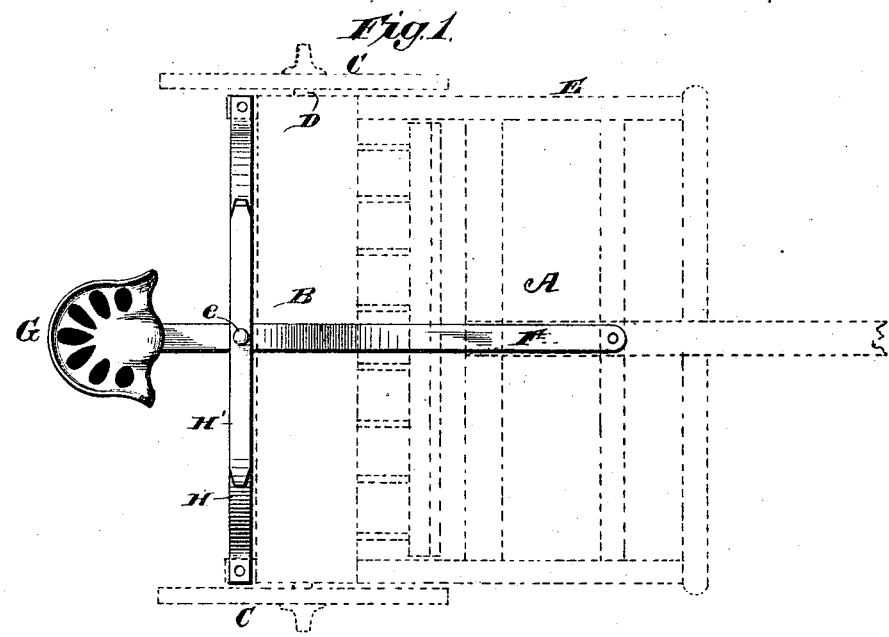
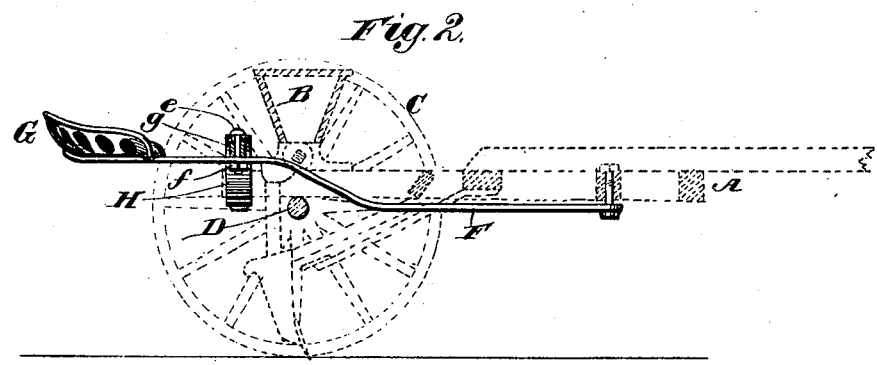
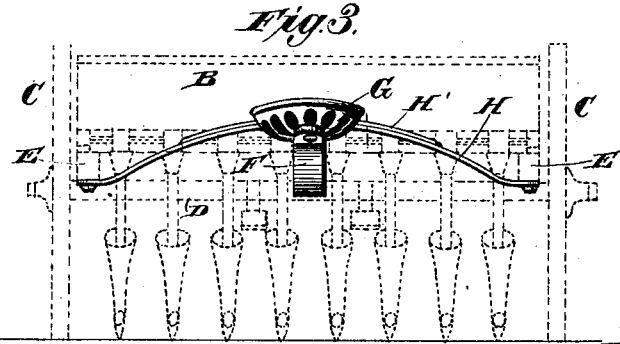
Witnesses.
Robert Everett
Jos. S. Coombs
Inventor.
Hanson P. Tenant.
By James L. Norris,
Atty.

United States Patent Office.

HANSON P. TENANT, OF DUBLIN, INDIANA, ASSIGNOR TO THE DUBLIN AGRICULTURAL COMPANY, OF SAME PLACE.

GRAIN-DRILL.

SPECIFICATION forming part of Letters Patent No. 291,809, dated January 8, 1884.

Application filed October 15, 1883. (No model.)

*To all whom it may concern:*

Be it known that I, HANSON P. TENANT, a citizen of the United States, residing at Dublin, in the county of Wayne and State of Indiana, have invented new and useful Improvements in Grain-Drills, of which the following is a specification.

My invention relates to grain-drills, and has for its purpose to provide a seat for the driver having elastic support both seat and support being arranged in rear of the hopper.

To this end my invention consists in the combination and arrangement of devices hereinafter described and claimed, reference being had to the accompanying drawings illustrating the invention, in which—

Figure 1 is a plan view of a grain-drill embodying my invention. Fig. 2 is a longitudinal section taken through the seat-supporting spring-bar. Fig. 3 is a rear elevation.

A in said drawings designates the drill-frame, which is made in the usual manner—as shown, for instance, in Letters Patent No. 256,764, granted to me the 18th day of April, 1882. Upon this frame is mounted a hopper, B, together with the other parts composing the drill, which require no specific description, as they are of the usual form. The whole is carried by wheels, C, connected by an axle, D, which extends transversely across the frame, beneath the hopper, having its bearings in the side bars, E.

To one of the transverse bars of the frame A, near its forward end, I attach a steel spring-bar, F, which extends beneath said frame toward the rear, its end projecting beyond the hopper sufficiently far to permit the seat G to be mounted thereon and leave the required intermediate space. A short distance in front of the seat, and in rear of the hopper, is placed a transverse arched steel plate, H, having a spring temper, said plate passing over the seat-bar F, to which it is connected by means of a bolt, *e*, and nut *f*, a sleeve, *g*, being slipped upon the bolt between the spring-plate H and the seat-bar F. The ends of the former have support upon the side bars, E, of the frame A, being attached to their under side in order to give the spring a greater arch. If required, the spring-plate H may be re-enforced by an independent plate, H', laid upon it and fastened centrally by the bolt *e*.

It will be seen that the attachment of the transverse spring furnishes a fulcrum-point to the seat-bar F, allowing the outer end to spring downward, and that portion forward of the spring H to spring upward, the weight imposed upon the seat being at the same time supported by the transverse spring-plate H. The combined elasticity of these parts gives a most perfect support for the seat.

I am aware that it is not new to support a seat on longitudinal and transverse spring-bars, and that seats have been arranged in rear of the hoppers of grain-drills; and I do not, therefore, broadly claim such features.

Having thus described my invention, what I claim is—

1. In a grain-drill, the combination, with a frame carrying the hopper, of a spring-bar having one end attached to the frame and extending longitudinally beneath the hopper to a point in rear thereof, a seat secured to the rear end of the spring-bar, and a transverse support for the rear of said bar, substantially as described.

2. In a grain-drill composed, essentially, of a frame supporting the hopper, the combination therewith of a spring-bar secured at its forward end to the frame, and extending longitudinally below the hopper to the rear thereof, a seat rigid on the rear end of the bar, and a transverse spring-support connected with the frame and sustaining the spring-bar at a point between the seat and the hopper, substantially as described.

3. The combination, with the grain-drill frame carrying a hopper, of a bar, F, secured at its forward end to the frame, and extending longitudinally under the hopper to the rear thereof, a seat on the rear end of said bar, and an arched spring connected at its ends with the sides of the drill-frame, and sustaining the spring-bar between its forward end and the seat, substantially as described.

4. In a grain-drill composed, essentially, of a frame carrying a hopper, of a spring-bar having its forward end secured to the frame, and extending longitudinally under the hopper to the rear thereof, a seat mounted on the rear end of the bar, and a transverse spring having its ends connected with the frame and attached to the spring-bar between the seat thereon and the hopper, substantially as described.

5. The combination, with a grain-drill composed, essentially, of a frame and a hopper thereon, of a longitudinal spring-bar extending in rear of the hopper and carrying a seat at its rear end, and a transverse spring arched over the bar in rear of the hopper and in front of the seat, and a bolt suspending the rear portion of the bar beneath the arched spring, substantially as described.

In testimony whereof I have hereunto set my hand in the presence of two subscribing witnesses.

HANSON P. TENANT.

Witnesses:
ALPHEUS HUDDESTON,
GEO. W. CHAMP.